US008133987B2

(12) United States Patent
Kuimelis et al.

(10) Patent No.: US 8,133,987 B2
(45) Date of Patent: *Mar. 13, 2012

(54) PRIMER ARRAY SYNTHESIS AND VALIDATION

(75) Inventors: Robert G. Kuimelis, Palo Alto, CA (US); Glenn H. McGall, Palo Alto, CA (US)

(73) Assignee: Affymetrix, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/938,231

(22) Filed: Nov. 2, 2010

(65) Prior Publication Data
US 2011/0046343 A1  Feb. 24, 2011

Related U.S. Application Data

(63) Continuation of application No. 11/323,067, filed on Dec. 30, 2005.

(60) Provisional application No. 60/640,275, filed on Dec. 31, 2004.

(51) Int. Cl.
 C07H 21/00 (2006.01)
 C07H 21/02 (2006.01)
(52) U.S. Cl. ..................... 536/23.1; 536/25.3
(58) Field of Classification Search .................. 536/23.1, 536/25.3
See application file for complete search history.

(56) References Cited

U.S. PATENT DOCUMENTS

| | | |
|---|---|---|
| 2,646,430 A | 7/1953 | Brooker et al. |
| 3,879,356 A | 4/1975 | Pacifici |
| 3,944,538 A | 3/1976 | Bodanszky |
| 3,974,289 A | 8/1976 | Buckle et al. |
| 4,242,974 A | 1/1981 | Beckerman |
| 4,749,379 A | 6/1988 | Junino et al. |
| 4,904,276 A | 2/1990 | Junino et al. |
| 5,143,854 A | 9/1992 | Pirrung et al. |
| 5,200,051 A | 4/1993 | Cozzette et al. |
| 5,212,050 A | 5/1993 | Mier et al. |
| 5,215,899 A | 6/1993 | Dattagupta |
| 5,242,974 A | 9/1993 | Holmes |
| 5,384,261 A | 1/1995 | Winkler et al. |
| 5,412,087 A | 5/1995 | McGall et al. |
| 5,413,854 A | 5/1995 | Sato |
| 5,420,328 A | 5/1995 | Campbell |
| 5,424,186 A | 6/1995 | Fodor et al. |
| 5,430,136 A | 7/1995 | Urdea et al. |
| 5,445,934 A | 8/1995 | Fodor et al. |
| 5,489,678 A | 2/1996 | Fodor et al. |
| 5,503,805 A | 4/1996 | Sugarman et al. |
| 5,527,681 A | 6/1996 | Holmes |
| 5,541,061 A | 7/1996 | Fodor et al. |
| 5,547,860 A | 8/1996 | Kocher et al. |
| 5,580,697 A | 12/1996 | Keana et al. |
| 5,582,955 A | 12/1996 | Keana et al. |
| 5,639,603 A | 6/1997 | Dower et al. |
| 5,650,489 A | 7/1997 | Lam et al. |
| 5,677,195 A | 10/1997 | Winkler et al. |
| 5,700,637 A | 12/1997 | Southern |
| 5,763,599 A | 6/1998 | Pfleiderer et al. |
| 5,770,358 A | 6/1998 | Dower et al. |
| 5,830,539 A | 11/1998 | Yan et al. |
| 5,959,098 A | 9/1999 | Goldberg et al. |
| 5,959,298 A | 9/1999 | Belcher et al. |
| 5,969,116 A | 10/1999 | Martin |
| 6,022,597 A | 2/2000 | Yan et al. |
| 6,022,963 A | 2/2000 | McGall et al. |
| 6,040,193 A | 3/2000 | Winkler et al. |
| 6,054,504 A | 4/2000 | Dalla Riva Toma |
| 6,147,205 A | 11/2000 | McGall et al. |
| 6,191,046 B1 | 2/2001 | Singh et al. |
| 6,262,216 B1 | 7/2001 | McGall |
| 6,287,776 B1 | 9/2001 | Hefti |
| 6,358,684 B1 | 3/2002 | Lee |
| 6,440,677 B2 | 8/2002 | Lipshutz et al. |
| 6,472,541 B2 | 10/2002 | Tsien et al. |
| 6,566,515 B1 | 5/2003 | McGall et al. |
| 6,632,641 B1 | 10/2003 | Brennan et al. |
| 6,806,361 B1 | 10/2004 | Kajisa et al. |
| 6,824,866 B1 | 11/2004 | Glazer et al. |
| 6,833,450 B1 | 12/2004 | McGall et al. |
| 6,841,333 B2 | 1/2005 | Lamanna et al. |
| 6,881,836 B2 | 4/2005 | McGall et al. |
| 6,887,665 B2 | 5/2005 | Trulson et al. |
| 7,005,259 B1 | 2/2006 | McGall et al. |
| 7,291,471 B2 | 11/2007 | Sampson et al. |
| 7,385,050 B2 | 6/2008 | Dellinger et al. |
| 7,470,783 B2 | 12/2008 | McGall et al. |
| 7,547,775 B2 | 6/2009 | Kuimelis et al. |
| 7,803,934 B2 | 9/2010 | Kuimelis et al. |

(Continued)

FOREIGN PATENT DOCUMENTS

DE   3612665   10/1986

(Continued)

OTHER PUBLICATIONS

Hasan et al. Tetrahedron vol. 53, Issue 12, Mar. 24, 1997, pp. 4247-4264.*
Atherton, E.; "Table of Contents", Solid Phase Peptide Synthesis: A Practical Approach, New York: IRL Press at Oxford University Press, (1989(, pp. vii-ix.
Barker et al., "The Nitration of $\alpha$- and $\beta$-Acylnaphthalenes," Aust. J. Chem., 48:1969-1979 (1995).
Binkowski et al., "Correcting errors in synthetic DNA through consensus shuffling," Nucleic Acids Res., 33(6): e55 (2005).
Boekelheide et al., "The Conversion of Liloline Derivatives to Quinolinium Salts Using Cyanogen Bromide," J. Org. Chem., 19:504-509 (1954).
Bos, "Amino-acid substitutions at condon 13 of the N-ras oncogene in human acute myeloid leukamia", Nature, 315, (1985), pp. 726-730.

(Continued)

*Primary Examiner* — Jezia Riley
(74) *Attorney, Agent, or Firm* — Thomas J. Siepmann

(57) ABSTRACT

Methods are presented for generating large sets for polymers. The methods employ high density oligonucleotide array.

5 Claims, No Drawings

U.S. PATENT DOCUMENTS

| | | |
|---|---|---|
| 2002/0042112 A1 | 4/2002 | Koster et al. |
| 2003/0040618 A1 | 2/2003 | Barone et al. |
| 2006/0147969 A1 | 7/2006 | Kuimelis et al. |
| 2007/0238185 A1 | 10/2007 | Kuimelis et al. |
| 2009/0192050 A1 | 7/2009 | Kuimelis et al. |
| 2011/0028350 A1 | 2/2011 | McGall et al. |

FOREIGN PATENT DOCUMENTS

| | | |
|---|---|---|
| EP | 0837141 | 1/2003 |
| EP | 1547678 | 6/2005 |
| JP | 7-168356 | 7/1995 |
| JP | 10-114765 | 5/1998 |
| JP | 11-29590 | 2/1999 |
| WO | WO 89/10977 | 11/1989 |
| WO | WO 90/15070 | 12/1990 |
| WO | WO 92/00091 | 1/1992 |
| WO | WO 92/10092 | 6/1992 |
| WO | WO 92/12492 | 7/1992 |
| WO | WO 93/22684 | 4/1993 |
| WO | WO 93/06121 | 11/1993 |
| WO | WO 94/10128 | 5/1994 |
| WO | WO 96/18634 | 6/1996 |
| WO | WO 98/39348 | 9/1998 |
| WO | WO 00/31588 | 6/2000 |
| WO | WO 02/20150 | 3/2002 |
| WO | WO 2006/044956 | 4/2006 |

OTHER PUBLICATIONS

Bras et al., "Optimisation of a silicon/silicon dioxide substrate for a fluorescence DNA microarray," Biosens. Bioelectron., 20: 797-806 (2004).

Braun, "Fluorescence interference-contrast microscopy of cell adhesion on oxidized silicon," Applied Physics, A65, pp. 341-348 (1997).

Braun, "Fluorescence interferometry of nuraonal cell adhesion on microstructured silicon," The American Physical Society, 81, pp. 5241-5244 (1998).

Bromidge et al., "Novel and Selective 5-$HT_{2C/2B}$ Receptor Antagonists as Potential Anxiolytic Agents: Synthesis, Quantitative Structure-Activity Relationships, and Molecular Modeling of Substituted 1-(3-Pyridylcarbamoyl) Indolines," J. Med. Chem., 41(10):1598-1612 (1998).

Catalanotti et al., "Synthesis of [1-$^{15}$N]-2'-Deoxyinosine, [4-$^{15}$N]-2'-DeoxyAICAR, and [1-$^{15}$N]-2'-Deoxyguanosine," Eur. J. Org. Chem., 2235-2239 (1999).

Crooke, S.T., et al., "Table of Contents", Antisense Research and Applications, Crook, S.T., Ed. CRC Press, Boca Raton, FL, (1993), 4 pages.

Danish et al., "Dienophilic Reactions of Aromatic Double Bonds in the Synthesis of β-Substituted Naphthalenes," J. Am. Chem. Soc., 76:6144-6150 (1954).

Ding et al., "Synthesis of a Furano[4, 3, 2-de]Quinoline Nucleus: A Derivative of the Discorhabdin Alkaloids," Heterocylic Commun., 3(6): 489-492 (1997).

Drexhage, "IV Interaction of Light with Monomolecular Dye Layers," In Progress in Optics, vol. 12, pp. 163-232 (1974).

Elder, "Analysis of DNA oligonucleotide hybridization data by maximum entropy", Maximum Entropy and Bayesian Methods, A. Mohammad-Djafara and C. Demoments (eds.) Kluwer Academic Publishers: The Netherlands, pp. 363-371 (1993).

Fenyes, J.G., "Preparation of Halogenated Nitronaphthalenes Halogenated Naphthylamines, and their Sulfonic Acids," J. Org. Chem. 27:2614-2618 (1962).

Flickinger et al., "Spatial photorelease of oligonucleotides, using a safety-catch photolabile linker," Organic Letters, 8(11): 2357-2360 (2006).

Fodor et al., "Light-directed, spatially addressable parallel chemical synthesis", Science, 251, (1991), pp. 767-773.

Fourrey et al., "1,1-bis-(4-methoxyphenyl)-1'-pyrenyl methyl (bmpm): A New Fluorescent 5' Protecting Group for the Purification of Unmodified and Modified Oligonucleotides", Tetrahedron Letters, 28(43), (1987), pp. 5157-5160.

Fuhrmann et al., "Removal of mismatched bases from synthetic genes by enzymatic mismatch cleavage," Nucleic Acids Res., 33(6): e58 (2005).

Furuta et al., "Direct Esterification of Phosphates with Various Halides and Its Application to Synthesis of cAMP Alkyl Triesters", J. Chem Soc. Perkin Trans., 1, (1993), pp. 3139-3142.

Gall et al., "Synthesis of 7-Substituted Indoline Derivatives," J. Org. Chem., 20:1538-1544 (1955).

Gallop et al., "Applications of Combinatorial Technologies to Drug Delivery. 1. Background and Peptide Combinatorial Libraries", J. Med. Chem., 37 (9), (1994), pp. 1233-1251.

Geysen et al., "Strategies for Epitope Analysis Using Peptide Synthesis", J. Immunol. Meth., 102, (1987), pp. 259-274.

Givens et al., "Photochemistry of Phosphates Esters", Chem. Rev., 93, (1993), pp. 55-66.

Hochgeschwender et al., "Preferential Expression of a Defined T-cell Receptor Beta-chain gene in Hapten-specific Cytotoxic T-cell Clones", Nature, 322, (1986), pp. 376-378.

Houghten et al., "Generation and use of synthetic peptide combinatorial libraries for basic research and drug delivery", Nature, 354, (1991), pp. 84-86.

Hua et al., "An Improved Procedure fo the Pechmann Condensation in the Synthesis of 8-Ethyltrimethoxy-6H-benzo[d]naphto[1, 2-b]-pyran-6-ones Structurally Related to the Aglycon of Gilyocarcins," J. Org. Chem., 57:399-403 (1992).

Iwamura et al., "1-pyrenylmethyl esters, photolabile protecting groups for carboxylic acids", Tetrahedron Letters, 28(6): 679-682 (1987).

Iwamura et al., "Photoreactivity of 1-pyrenylmethy esters. Dependence on the structure of the carboxylic acid moieties and the nature of the excited states", Chemistry Letters, pp. 1729-1732 (1987).

Kelly et al., "Relative Binding Affinity of Carboxylate and Its Isosteres: Nitro, Phosphate, Phosphonate, Sufonate, and δ-Lactone," J. Am. Chem. Soc., 116:7072-7080 (1994).

Lam, "A new type of synthetic peptide library for identifying ligand-binding activity", Nature, 354, (1991), pp. 82-84.

Lambacher et al., "Fluorescence interference-contrast microscopy on oxidized silicon using a monomolecular dye layer," Applied Physics, A63, pp. 207-216 (1996).

Legros, J,-Y. e tal., Tetrahedron, "Palladium-Catalyzed Substitution of Esters of Naphthylmethanols, 1-Naphythlethanols , and Analoges by Sodium Simethyl Malonate. Stereoselective Synthesis from Enantiomerically Pure Substrates", vol. 51, issue 11, pp. 3235-3246, published Mar. 1995.

Liu et al., "Fluorescence Properties of Benz[f]indole, a Wavelength and Quenching Selective Tryptophan Analog," J. Phys. Chem. B, 104:1837-1843 (2000).

Loakes, "Survey and summary: The applications of universal DNA base analogues," Nucleic Acids Res., 29, pp. 2437-2447 (Jun. 2001).

Martinez et al., "Synthese D'Esters "Actives" D'Acides Amines Avec L'Hexachlorocyclotriphosphatriazene," Tetrahedron Lett., 31:2631-2632 (1975).

Neuner, "New Non Nucleosidic Phosphoramidite Reagent for Solid Phase Synthesis of Biotinylated Oligonucleotides," Biorg. & Med. Chem. Lett., 6(2): 147-152 (1996).

Oleinikov et al., "RNA interference by mixtures of siRNAs prepared using custom oligonucleotide arrays," Nucleic Acids Research, 33(10): e92 (2005).

Patel et al., "Studies on 6:7-Dihydroxy-4-Methylcoumarin and Its Methyl Ethers," J. Indian Chem. Soc., 37(4): 227-230 (1960).

Pieles et al., "A Protected Biotin Containing Deoxycytidine Building Block for Solid Phase Synthesis of Biotinylated Oligonucleotides," Nucleic Acids Res., 18:4355-4360 (1990).

Pirrung et al., "A Universal, Photocleavable DNA base: Nitropiperonyl 2'-Deoxyriboside," J. Org. Chem., 66, pp. 2067-2071 (Mar. 2001).

Pratviel et al., "DNA and RNA Cleavage by Metal Complexes," Advances in Inorganic Chemistry, vol. 45, pp. 251-312 (1998).

Reetz et al., "Chemoselective Addition of Organotitanium Reagents to Carbonyl Compounds," Chem. Ber., 118:1421-1440 (1985).

Riesgo et al., "Introductions of Benzo[h]quinoline and 1,10-Phenanthroline Subunits by Friedlander Methodology," J. Org. Chem., 61:3017-3022 (1996).

Saboulard et al., "High-throughput site-directed mutagenesis using oligonucleotides synthesized on DNA chips," BioTechniques, 39: 363-368 (2005).
Sanghvi et al., "Carbohydrates: Synthetic Methods and Applications in Antisense Therapeutics" in Carbohydrate Modifications in Antisense Research, American Chemical Society: Washington, D.C., pp. 1-22 (1994).
Sethna et al., "The Pechmann Reaction," Organic Reactions, 7:1-58 (1953).
Southern et al., "Analyzing and comparing nucleic acid sequences by hybridization to arrays of oligonuceotides: evaluation using experimental models", Genomics, 13, (1991), pp. 1008-1017.
Stahler et al., "Another side of genomics: synthetic biology as a means for the exploitation of whole-genome sequence information," Journal of Biotechnology, 124: 206-212 (2006).
Takechi et al., "Screening Search for Organic Fluorophores: Syntheses and Fluorescence Properties of 3-Azolyl-7-dietylaminocoumarin Derivatives," Chem. Pharm. Bulletin, 48(11): 1702-1710 (2000).
Tian et al., "Accurate multiplex gene synthesis from programmable DNA microchips," Nature, 432, pp. 1050-1054 (Dec. 2004).
Verlann-DeVries et al., "A dot-blot screening procedure for mutated ras oncogenes using synthetic oligodeoxynucleotides", Gene, 50, (1986), pp. 313-320.
Wang et al., "Solid phase synthesis of protected peptides via photolytic cleavage of the alpha-methylphenacy ester anchoring linkage", J. Org. Chem., 41(20), (1976), pp. 3258-3261.
Watanbe et al., "Trifluoromethylation and Pentafluoroethylation of Terpenoid Carbonyl Compounds Used in Perfumery," J. Fluorine Chem., 73:21-26 (1995).
Wiley et al., "Structure-Based Design of Potent, Amidine-Derivied Inhibitors of Factor Xa:Evaluation of Selectivity, Anticoagulant Activity, and Antithrombotic Activity," J. Med. Chem., 43:883-899 (2000).
Xiong et al., "A simple, rapid, high-fidelity and cost-effective PCR-based two-step DNA synthesis method for long gene sequences," Nucleic Acids Res., 32: e98 (2004).
Young et al., "Two-step total gene synthesis method," Nucleic Acids Res., 32: e59 (2004).
Zhou et al., "Microfluidic PicoArray synthesis of oligodeoxynucleotides and simultaneous assembling of multiple DNA sequences," Nucleic Acids Res., 32: 5409-5417 (2004).
U.S. Appl. No. 12/855,450, filed Aug. 2010, Kuimelis et al.
U.S. Appl. No. 12/938,262, filed Nov. 2010, Kuimelis et al.
Adams et al., "Controlling cell chemistry with caged compounds," Ann. Rev. Physiol., 55: 755-784 (1993).
Ajayaghosh and Pillai, "Polymer-supported synthesis of protected peptide segments on a photosensitive o-nitro (alpha-methyl) bromobenzyl resin," Tetrahedron Letters, 44(21): 6661-6666 (1988).
Amit et al., "Photosensitive protecting groups of amino sugars and their use in glycoside synthesis. 2-nitrobenzyloxycarbonylamino and 6-nitroveratryloxycarbonylamino derivatives," J. Org. Chem., 39: 192-196 (1974).
Corrie et al., "Chapter 5: Caged Nucleotides and Neurotransmitters," in: Biological Applications of Photochemical Switches, vol. 2 (Bioorganic Photochemistry Series), Morrison. H. Ed., Wiley & Sons, pp. 243-305 (1993).
Dutta et al., "A Study of the Reformatsky Reaction on Formylcoumarins," Can. J. Chem., 73(9): 1556-1562 (1995).
Dyer and Turnbull, "Hydrolytic Stabilization of Protected p-Hydroxybenzyl Halides Designed as Latent Quinone Methide Precursors," J. Org. Chem., 64:7988-7995 (1995).
Enders et al., "Highly Enantioselective α-Alkenylation of Aldehydes and Ketones," Synthesis, 5: 621-626 (1997).
Fodor, Presentation on "The Human Genome in 100 Chemical Steps," Royal Society of Chemistry, University of Cambridge, Dec. 9, 2005.
Furuta et al., "Anthraquinon-2-ylmethoxycarbonyl (Aqmoc): A New Photochemically Removable Protecting Group for Alcohols," Organic Letters, 3(12): 1809-1812 (2001).
Furuta et al., "New Photochemically Labile Protecting Group for Phosphates," Chemistry Letters, pp. 1179-1182 (1993).

Garcia-Echeverria, "A Base Labile Handle for Solid Phase Organize Chemistry," Tetrahedron Lett., 38(52): 8933-8934 (1997).
Giegrich et al., "New photolabile protecting groups in nucleoside and nucleotide chemistry—synthesis, cleavage mechanisms and applications," Nucleosides & Nucleotides, 17(9-11): 1987-1996 (1998).
Gordon et al., "Applications of Combinatorial Technologies to Drug Discovery. 2. Combinatorial Organic Synthesis, Library Screening Strategies, and Future Directions," J. Med. Chem., 37(10): 1385-1401 (1994).
Hammer et al., "Practical Approach to Solid-Phase Synthesis of C-terminal Peptide Amides Under Mild Conditions Based on a Photolysable Anchoring Linkage," Int. J. Peptide Protein Res., 36: 31-45 (1990).
Holmes and Kiangsoontra, "Development of a new photo-removable protecting group for the amino and carboxyl groups of amino acids," in: Peptides: Chemistry, Structure, and Biology, vol. 13, Hodges, R.S., et al., Eds., Escom Science Publishers (Proceeding of the 13th American Peptide Symposium: Jun. 20-25, 1993, Edmonton, Alberta, Canada), pp. 110-112 (1994).
Ito and Maruyama, "Studies on Stable Diazoalkanes as Potential Fluorogenic Reagents. I. 7-Subsituted 4-Diazomethylcoumarins." Chem. Pharm. Bull., 31(9): 3014-3023 (1983).
Ito and Nakajima, "Selenium Dioxide Oxidation of Alkylcoumarins and Related Metyl-Substituted Heteroaromatics," J. Heterocyclic Chem., 25: 511-514 (1988).
Iwamura et al., "1-(α-diazbenzyl)pyrene: a reagent for photolabile and fluorescent protection of carboxyl groups of amino acids and peptides," Synlett, pp. 35-36 (1991).
Lloyd-Williams et al., "Convergent solid-phase peptide synthesis," Tetrahedron Letters, 49(48): 11065-11133 (1993).
McGall et al., "The Efficiency of Light-Directed Synthesis of DNA Arrays on Glass Substrates," Journal American Chemical Society, 119(22): 5081-5090 (1997).
McGall, "Chapter 2: The fabrication of high density oligonucleotides arrays for hybridization-based sequence analysis," in: Biochip Arrays and Integrated Devices for Clinical Diagnostics, IBC Library Series, based on the transcripts from IBC's International Conference held in San Diego, CA, Mar. 5-6, 1997, pp. 2.1-2.33.
McGall, Presentation on "Photolithographic Fabrication of High-Density Oligonucleotide Arrays: Challenges and Opportunities" at Second Annual Meeting of the Oligonucleotide Therapeutics Society, New York Academy of Sciences, Rockefeller University, Oct. 19-21 (2006).
Mortensen et al., "Improved Preparation of Some Nitroindolines," OPPI Briefs, 28(1): 123-125 (1996).
Okada et al., "(1-pyrenyl)methyl carbamates for fluorescent 'caged' amino acids and peptides," Photochemistry and Photobiology, 61(5): 431-434 (1995).
Papageorgiou et al., "Photorelease of Carboxylic Acids from 1-Acyl-7-nitroindolines in Aqueous Solution: Rapid and Efficient Photorelease of L-Glutamate," J. Am. Chem. Soc., 121: 6503-6504 (1999).
Patchornik et al., "Photosensitive Protecting Groups," J. Am. Chem. Soc., 92(21): 6333-6335 (1970).
Pease et al., "Light-generated oligonucleotide arrays for rapid DNA sequence analysis," Proc. Natl. Acad. Sci., 91: 5022-5026 (1994).
Pillai, "Photolytic deprotection and activation of functional groups," Organic Photochemistry, A. Padwa, Ed., Marcel Dekker, 9: 225-323 (1987).
Pillai, "Photoremovable protecting groups in organic synthesis," Synthesis, International Journal of Methods in Synthetic Organic Chemistry, Schill et al., Eds., pp. 1-26 (1980).
Rich and Gurwara, "Preparation of a new o-nitorbenzyl resin for solid-phase synthesis of tertbutyloxycarbonyl-protected peptide acids," J. Amer. Chem. Soc., 97(6): 1575-1579 (1975).
Richmond et al., "Amplification and assembly of chip-eluted DNA (AACED): a method for high-throughput gene synthesis," Nucleic Acids Research, 32: 5011-5018 (2004).
Weiler and Hoheisel, "Combining the Preparation of Oligonucleotide Arrays and Synthesis of High-Quality Primers," Anal. Biochem, 243(2): 218-227 (1996).

Zehavi, "Applications of photosensitive protecting groups in carbohydrate chemistry," Adv. Carbohydrate Chem. Biochem., 46: 179-204 (1988).

Bennett et al., "A Synthesis of Dihydroindole, Dihydrothionaphthen, and Dihydrobenzofuran," J. Chem. Soc., 287-288 (1941).

CAS Abstracts—RN 56564-38-6 (1975).

Williams et al, "Convergent Solid-Phase Peptide Synthesis", Tetrahedron, 49/48, 11065-11133 (1993).

Yankee et al., "Photosensitive Protecting Groups," Journal of the American Chemical Society, 92(21): 6333-6335 (1970).

* cited by examiner

PRIMER ARRAY SYNTHESIS AND VALIDATION

CROSS REFERENCE TO RELATED APPLICATIONS

This application is a continuation of U.S. application Ser. No. 11/323,067, filed Dec. 30, 2005, which claims the benefit of priority of U.S. Provisional Application Ser. No. 60/640,275, filed Dec. 31, 2004, each of which is hereby incorporated by reference in its entirety for all purposes.

FIELD OF THE INVENTION

The present invention relates to the preparation of primers for PCR. More specifically, the present invention relates to the use of photolithographic arrays for the preparation of high numbers of primers for PCR.

BACKGROUND OF THE INVENTION

PCR techniques are well-established and widely used across various segments of life-science research, diagnostics, etc. An increasingly important trend in the application of PCR is the ability to multiplex the reaction, which requires, in addition to the usual thermal cycling equipment and enzyme, sets of carefully designed oligonucleotide primers.

Oligonucleotide primers are traditionally prepared by the solid-supported phosporamidite approach, either on controlled-pore glass, polymeric support or membrane support. Following oligonucleotide assembly, the support is typically treated with a deprotection reagent to remove protecting groups and to cleave the oligonucleotide from the support in a single step. Due to the high stepwise efficiency of the solid-supported phosphoramidite approach, it is often not necessary to rigorously purify short oligonucleotides (25-40 mers) destined for use as PCR primers. More often, simple ethanol precipitation or cartridge separation is used to "desalt" the primer and remove small molecular-weight components. Although careful purification is atypical, some means of identity and purity confirmation (i.e., QC) are normally required and the collection of such data is considered good lab practice. Primer confirmation can usually be accomplished by high-throughput analytical techniques such as MALDI-TOF mass spectrometry and/or capillary gel electrophoresis.

Conventional small-scale solid-supported oligonucleotide synthesis methods (flow-through column, membrane, 96-well plate) produce enough primer for thousands of PCR reactions.

SUMMARY OF THE INVENTION

Methods are provided for releasing polymers from an array of polymers to provide oligonucleotide primers for PCR. One disclosed method has the steps of providing a solid substrate; attaching a plurality of linkers to the substrate, each said linker having a cleavable moiety, wherein the cleavable moiety is activatable at a distinct set of conditions and wherein activation of said cleavable moiety disrupts the linker to allow release of the polymer, to provide a plurality of attached linkers; attaching a first monomer to at least one of said plurality of linkers to provide an attached first monomer; attaching a second monomer to a least one of said attached first monomers or said attached plurality of polymers to provide an attached second monomer; attaching a third monomers to a least one of said attached first monomer, second monomers or plurality of linkers to provide an attached third monomer; repeating said step of attaching a monomer until the desired array of polymers is complete and subjecting the array to the distinct set of conditions to provide release of polymers from said array.

DETAILED DESCRIPTION OF THE INVENTION

A. General

The present invention has many preferred embodiments and relies on many patents, applications and other references for details known to those of the art. Therefore, when a patent, application, or other reference is cited or repeated below, it should be understood that it is incorporated by reference in its entirety for all purposes as well as for the proposition that is recited.

As used in this application, the singular form "a," "an," and "the" include plural references unless the context clearly dictates otherwise. For example, the term "an agent" includes a plurality of agents, including mixtures thereof.

An individual is not limited to a human being but may also be other organisms including but not limited to mammals, plants, bacteria, or cells derived from any of the above.

Throughout this disclosure, various aspects of this invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The practice of the present invention may employ, unless otherwise indicated, conventional techniques and descriptions of organic chemistry, polymer technology, molecular biology (including recombinant techniques), cell biology, biochemistry, and immunology, which are within the skill of the art. Such conventional techniques include polymer array synthesis, hybridization, ligation, and detection of hybridization using a label. Specific illustrations of suitable techniques can be had by reference to the example herein below. However, other equivalent conventional procedures can, of course, also be used. Such conventional techniques and descriptions can be found in standard laboratory manuals such as *Genome Analysis: A Laboratory Manual Series (Vols. I-IV), Using Antibodies: A Laboratory Manual, Cells: A Laboratory Manual, PCR Primer: A Laboratory Manual, and Molecular Cloning: A Laboratory Manual* (all from Cold Spring Harbor Laboratory Press), Stryer, L. (1995) *Biochemistry* (4th Ed.) Freeman, N.Y., Gait, *"Oligonucleotide Synthesis: A Practical Approach"* 1984, IRL Press, London, Nelson and Cox (2000), *Lehninger, Principles of Biochemistry* $3^{rd}$ Ed., W.H. Freeman Pub., New York, N.Y. and Berg et al. (2002) *Biochemistry*, $5^{th}$ Ed., W.H. Freeman Pub., New York, N.Y., all of which are herein incorporated in their entirety by reference for all purposes.

The present invention can employ solid substrates, including arrays in some preferred embodiments. Methods and techniques applicable to polymer (including protein) array synthesis have been described in U.S. Ser. No. 09/536,841, WO 00/58516, U.S. Pat. Nos. 5,143,854, 5,242,974, 5,252, 743, 5,324,633, 5,384,261, 5,405,783, 5,424,186, 5,451,683, 5,482,867, 5,491,074, 5,527,681, 5,550,215, 5,571,639, 5,578,832, 5,593,839, 5,599,695, 5,624,711, 5,631,734, 5,795,716, 5,831,070, 5,837,832, 5,856,101, 5,858,659, 5,936,324, 5,968,740, 5,974,164, 5,981,185, 5,981,956, 6,025,601, 6,033,860, 6,040,193, 6,090,555, 6,136,269, 6,269,846 and 6,428,752, in PCT Applications Nos. PCT/US99/00730 (International Publication No. WO 99/36760) and PCT/US01/04285 (International Publication No. WO 01/58593), which are all incorporated herein by reference in their entirety for all purposes.

Patents that describe synthesis techniques in specific embodiments include U.S. Pat. Nos. 5,412,087, 6,147,205, 6,262,216, 6,310,189, 5,889,165, and 5,959,098. Nucleic acid arrays are described in many of the above patents, but the same techniques are applied to polypeptide arrays.

Nucleic acid arrays that are useful in the present invention include those that are commercially available from Affymetrix (Santa Clara, Calif.) under the brand name GeneChip®. Example arrays are shown on the website at affymetrix.com.

The present invention also contemplates many uses for polymers attached to solid substrates. These uses include gene expression monitoring, profiling, library screening, genotyping and diagnostics. Gene expression monitoring and profiling methods can be shown in U.S. Pat. Nos. 5,800,992, 6,013,449, 6,020,135, 6,033,860, 6,040,138, 6,177,248 and 6,309,822. Genotyping and uses therefore are shown in U.S. Ser. Nos. 10/442,021, 10/013,598 (U.S. Patent Application Publication 20030036069), and U.S. Pat. Nos. 5,856,092, 6,300,063, 5,858,659, 6,284,460, 6,361,947, 6,368,799 and 6,333,179. Other uses are embodied in U.S. Pat. Nos. 5,871, 928, 5,902,723, 6,045,996, 5,541,061, and 6,197,506.

The present invention also contemplates sample preparation methods in certain preferred embodiments. Prior to or concurrent with genotyping, the genomic sample may be amplified by a variety of mechanisms, some of which may employ PCR. See, for example, *PCR Technology: Principles and Applications for DNA Amplification* (Ed. H. A. Erlich, Freeman Press, NY, N.Y., 1992); *PCR Protocols: A Guide to Methods and Applications* (Eds. Innis, et al., Academic Press, San Diego, Calif., 1990); Mattila et al., *Nucleic Acids Res.* 19, 4967 (1991); Eckert et al., *PCR Methods and Applications* 1, 17 (1991); *PCR* (Eds. McPherson et al., IRL Press, Oxford); and U.S. Pat. Nos. 4,683,202, 4,683,195, 4,800,159 4,965, 188, and 5,333,675, and each of which is incorporated herein by reference in their entireties for all purposes. The sample may be amplified on the array. See, for example, U.S. Pat. No. 6,300,070 and U.S. Ser. No. 09/513,300, which are incorporated herein by reference.

Other suitable amplification methods include the ligase chain reaction (LCR) (for example, Wu and Wallace, *Genomics* 4, 560 (1989), Landegren et al., *Science* 241, 1077 (1988) and Barringer et al. *Gene* 89:117 (1990)), transcription amplification (Kwoh et al., *Proc. Natl. Acad. Sci. USA* 86, 1173 (1989) and WO88/10315), self-sustained sequence replication (Guatelli et al., *Proc. Nat. Acad. Sci. USA*, 87, 1874 (1990) and WO90/06995), selective amplification of target polynucleotide sequences (U.S. Pat. No. 6,410,276), consensus sequence primed polymerase chain reaction (CP-PCR) (U.S. Pat. No. 4,437,975), arbitrarily primed polymerase chain reaction (AP-PCR) (U.S. Pat. Nos. 5,413,909, 5,861, 245) and nucleic acid based sequence amplification (NABSA). (See, U.S. Pat. Nos. 5,409,818, 5,554,517, and 6,063,603, each of which is incorporated herein by reference). Other amplification methods that may be used are described in, U.S. Pat. Nos. 5,242,794, 5,494,810, 4,988,617 and in U.S. Ser. No. 09/854,317, each of which is incorporated herein by reference.

Additional methods of sample preparation and techniques for reducing the complexity of a nucleic sample are described in Dong et al., *Genome Research* 11, 1418 (2001), in U.S. Pat. Nos. 6,361,947, 6,391,592 and U.S. Ser. Nos. 09/916,135, 09/920,491 (U.S. Patent Application Publication 20030096235), Ser. No. 09/910,292 (U.S. Patent Application Publication 20030082543), and Ser. No. 10/013,598.

Methods for conducting polynucleotide hybridization assays have been well developed in the art. Hybridization assay procedures and conditions will vary depending on the application and are selected in accordance with the general binding methods known including those referred to in: Maniatis et al. *Molecular Cloning: A Laboratory Manual* (2$^{nd}$ Ed. Cold Spring Harbor, N.Y., 1989); Berger and Kimmel *Methods in Enzymology*, Vol. 152, *Guide to Molecular Cloning Techniques* (Academic Press, Inc., San Diego, Calif., 1987); Young and Davism, *P.N.A.S*, 80: 1194 (1983). Methods and apparatus for carrying out repeated and controlled hybridization reactions have been described in U.S. Pat. Nos. 5,871,928, 5,874,219, 6,045,996 and 6,386,749, 6,391,623 each of which are incorporated herein by reference The present invention also contemplates signal detection of hybridization between ligands in certain preferred embodiments. See U.S. Pat. Nos. 5,143,854, 5,578,832; 5,631,734; 5,834,758; 5,936,324; 5,981,956; 6,025,601; 6,141,096; 6,185,030; 6,201,639; 6,218,803; and 6,225,625, in U.S. Ser. No. 10/389,194 and in PCT Application PCT/US99/06097 (published as WO99/47964), each of which also is hereby incorporated by reference in its entirety for all purposes.

Methods and apparatus for signal detection and processing of intensity data are disclosed in, for example, U.S. Pat. Nos. 5,143,854, 5,547,839, 5,578,832, 5,631,734, 5,800,992, 5,834,758; 5,856,092, 5,902,723, 5,936,324, 5,981,956, 6,025,601, 6,090,555, 6,141,096, 6,185,030, 6,201,639; 6,218,803; and 6,225,625, in U.S. Ser. Nos. 10/389,194, 60/493,495 and in PCT Application PCT/US99/06097 (published as WO99/47964), each of which also is hereby incorporated by reference in its entirety for all purposes.

The practice of the present invention may also employ conventional biology methods, software and systems. Computer software products of the invention typically include computer readable medium having computer-executable instructions for performing the logic steps of the method of the invention. Suitable computer readable medium include floppy disk, CD-ROM/DVD/DVD-ROM, hard-disk drive, flash memory, ROM/RAM, magnetic tapes and etc. The computer executable instructions may be written in a suitable computer language or combination of several languages. Basic computational biology methods are described in, for example Setubal and Meidanis et al., *Introduction to Computational Biology Methods* (PWS Publishing Company, Boston, 1997); Salzberg, Searles, Kasif, (Ed.), *Computational Methods in Molecular Biology*, (Elsevier, Amsterdam, 1998); Rashidi and Buehler, *Bioinformatics Basics: Application in Biological Science and Medicine* (CRC Press, London, 2000) and Ouelette and Bzevanis *Bioinformatics: A Practical Guide for Analysis of Gene and Proteins* (Wiley & Sons, Inc., 2$^{nd}$ ed., 2001). See U.S. Pat. No. 6,420,108.

The present invention may also make use of various computer program products and software for a variety of purposes, such as probe design, management of data, analysis, and instrument operation. See, U.S. Pat. Nos. 5,593,839, 5,795,716, 5,733,729, 5,974,164, 6,066,454, 6,090,555, 6,185,561, 6,188,783, 6,223,127, 6,229,911 and 6,308,170.

Additionally, the present invention may have preferred embodiments that include methods for providing genetic information over networks such as the Internet as shown in U.S. Ser. Nos. 10/197,621, 10/063,559 (United States Publication No. 20020183936), Ser. Nos. 10/065,856, 10/065,868, 10/328,818, 10/328,872, 10/423,403, and 60/482,389.

B. Definitions

The term "linker" means a molecule or group of molecules attached to a substrate and spacing a synthesized polymer from the substrate for exposure/binding to a receptor.

The term "activation energy wavelength" refers to that wavelength of electromagnetic radiation that will activate a photoprotective group or photocleavable group.

The term "solid support bound nucleotide" refers to a nucleic acid or an oligonucleotide that is covalently bonded to a solid-support. In all cases, the length of nucleotide(s) on a solid-support bound nucleotide is less than the length of nucleotides on a solid-support bound oligonucleotide that is produced from the solid-support bound nucleotide.

The term "activator" refers to a compound that facilitates coupling of one nucleic acid to another, preferably in 3'-position of one nucleic acid to 5'-position of the other nucleic acid or vice a versa.

The terms "quality," "performance" and "intensity" are used interchangeably herein when referring to oligonucleotide probes or binding of a target molecule to oligonucleotide probes mean sensitivity of oligonucleotide probes to bind to a target molecule while giving a minimum of false signals.

The terms "activated nucleoside" and "activated nucleotide" are used interchangeably herein and refer to natural or unnatural nucleic acid monomers having a pendant activating group such as phosphite-triester, phosphotriester, H-phosphonate, or preferably phosphoramidite group on at least one of the oxygen atoms of the sugar moiety. Preferably, the activating group is on the C-3' oxygen or C-5' oxygen of the nucleic acid monomer. Typically, the activating group is on the C-3' oxygen of the nucleic acid monomer, for synthesizing probes in the 3'→5' direction, with the oligonucleotide attached to the support via the 3'-end. The activating group is on the C-5' oxygen of the nucleic acid monomer, for synthesizing probes in the 5→3' ("reverse") direction, with the oligonucleotide attached to the support via the 5'-end.

The terms "phosphoramidite," "derivative," and "amidite" are used interchangeably herein and refer to a nucleic acid having a pendent phosphoramidite group.

The term "probe" refers to a surface-immobilized nucleic acid or oligonucleotide that is recognized by a particular target by virtue of having a sequence that is complementary to the target sequence. These may also be referred to as ligands.

The term "array" refers to a preselected collection of polymers which are associated with a surface of a substrate. In a preferred embodiment of the present invention, polymers are nucleic acids or, more preferably, oligonucleotide, which are also called oligonucleotide probes. An array can include nucleic acid or oligonucleotides of a given length having all possible monomer sequences made up of a specific basis set of monomers, or a specific subset of such an array. For example, an array of all possible oligonucleotides each having 8 nucleic acids includes 65,536 different sequences.

However, as noted above, a nucleic acid or oligonucleotide array also can include only a subset of the complete set of probes. Similarly, a given array can exist on more than one separate substrate, e.g., where the number of sequences necessitates a larger surface area or more than one solid substrate in order to include all of the desired oligonucleotide sequences.

The term "wafer" generally refers to a substantially flat sample of substrate (i.e., solid-support) from which a plurality of individual arrays or chips can be fabricated.

The term "functional group" means a reactive chemical moiety present on a given monomer, polymer, linker or substrate surface. Examples of functional groups include, e.g., the 3' and 5' hydroxyl groups of nucleotides and nucleosides, as well as the reactive groups on the nucleobases of the nucleic acid monomers, e.g., the exocyclic amine group of guanosine, as well as amino and carboxyl groups on amino acid monomers.

The term photoprotecting group (also called photolabile protecting groups or photogroup for short) means a material which is chemically bound to a reactive functional group on a monomer unit, linker, or polymer and which may be removed upon selective exposure to electromagnetic radiation or light, especially ultraviolet and visible light.

The term "reactive group" refers to a group that allows a covalent reaction to occur between for example a monomer and a linker or between a second monomer and a first attached monomer. A reactive group may be protected by photoprotective removable group. Removal of the photogroup, yields a deprotected reactive group. The terms "array" and "chip" are used interchangeably herein and refer to the final product of the individual array of nucleic acid or oligonucleotide sequences, having a plurality of positionally distinct oligonucleotide sequences coupled to the surface of the substrate. "Array" is used with reference to nucleic acid or oligonucleotide, but it should be appreciated that either can be-attached to a solid support. Reference will be made to olinonucleotide arrays as a preferred example of the present invention.

The term "alkyl" refers to a branched or straight chain acyclic, monovalent saturated hydrocarbon radical of one to twenty carbon atoms. The term "alkenyl" refers to an unsaturated hydrocarbon radical which contains at least one carbon-carbon double bond and includes straight chain, branched chain and cyclic radicals.

The term "alkynyl" refers to an unsaturated hydrocarbon radical which contains at least one carbon-carbon triple bond and includes straight chain, branched chain and cyclic radicals.

The term "aryl" refers to an aromatic monovalent carboxylic radical having a single ring (e.g., phenyl) or two condensed rings (e.g., naphthyl), which can optionally be mono-, di-, or tri-substituted, independently, with alkyl, lower-alkyl, cycloalkyl, hydroxylower-alkyl, aminoloweralkyl, hydroxyl, thiol, amino, halo, nitro, lower-alkylthio, lower-alkoxy, mono-lower-alkylamino, di-lower-alkylamino, acyl, hydroxycarbonyl, lower-alkoxycarbonyl, hydroxysulfonyl, lower-alkoxysulfonyl, lower-alkylsulfonyl, lower-alkylsulfinyl, trifluoromethyl, cyano, tetrazoyl, carbamoyl, lower-alkylcarbamoyl, and di-lower-alkylcarbamoyl.

Alternatively, two adjacent positions of the aromatic ring may be substituted with a methylenedioxy or ethylenedioxy group. The term "heteroaromatic" refers to an aromatic monovalent mono- or poly-cyclic radical having at least one heteroatom within the ring, e.g., nitrogen, oxygen or sulfur, wherein the aromatic ring can optionally be mono-, di- or tri-substituted, independently, with alkyl, lower-alkyl, cycloalkyl, hydroxylower-alkyl, aminolower-alkyl, hydroxyl, thiol, amino, halo, nitro, lower-alkylthio, loweralkoxy, mono-lower-alkylamino, di-lower-alkylamino, acyl, hydroxycarbonyl, lower-alkoxycarbonyl, hydroxysulfonyl, lower-alkoxysulfonyl, lower-alkylsulfonyl, lower-alkylsulfinyl, trifluoromethyl, cyano, tetrazoyl, carbamoyl, loweralkylcarbamoyl, and di-lower-alkylcarbamoyl. For example, typical heteroaryl groups with one or more nitrogen atoms are tetrazoyl, pyridyl (e.g., 4-pyridyl, 3-pyridyl, 2-pyridyl), pyrrolyl (e.g., 2-pyrrolyl, 2-(N-alkyl)pyrrolyl), pyridazinyl, quinolyl (e.g. 2-quinolyl, 3-quinolyl etc.), imidazolyl, isoquinolyl, pyrazolyl, pyrazinyl, pyrimidinyl, pyridonyl or pyridazinonyl; typical oxygen heteroaryl radicals with an oxygen atom are 2-furyl, 3-furyl or benzofuranyl; typical sulfur heteroaryl radicals are thienyl, and benzothienyl; typical mixed heteroatom heteroaryl radicals are furazanyl and phenothiazinyl.

Further the term also includes instances where a heteroatom within the ring has been oxidized, such as, for example, to form an N-oxide or sulfone. The term "optionally substituted" refers to the presence or lack thereof of a substituent on the group being defined. When substitution is present the group may be mono-, di- or tri-substituted, independently, with alkyl, lower-alkyl, cycloalkyl, hydroxylower-alkyl, aminoloweralkyl, hydroxyl, thiol, amino, halo, nitro, lower-alkylthio, lower-alkoxy, mono-lower-alkylamino, di-lower-alkylamino, acyl, hydroxycarbonyl, lower-alkoxycarbonyl, hydroxysulfonyl, lower-alkoxysulfonyl, lower-alkylsulfonyl, lower-alkylsulfinyl, trifluoromethyl, cyano, tetrazoyl, carbamoyl, lower-alkylcarbamoyl, and di-lower-alkylcarbamoyl. Typically, electron-donating substituents such as alkyl, lower-alkyl, cycloalkyl, hydroxylower-alkyl, aminoloweralkyl, hydroxyl, thiol, amino, halo, lower-alkylthio, lower-alkoxy, mono-lower-alkylamino and di-lower-alkylamino are preferred.

The term "electron donating group" refers to a radical group that has a lesser affinity for electrons than a hydrogen atom would if it occupied the same position in the molecule. For example, typical electron donating groups are hydroxy, alkoxy (e.g. methoxy), amino, alkylamino and dialkylamine.

The term "leaving group" means a group capable of being displaced by a nucleophile in a chemical reaction, for example halo, nitrophenoxy, pentafluorophenoxy, alkyl sulfonates (e.g., methanesulfonate), aryl sulfonates, phosphates, sulfonic acid, sulfonic acid salts, and the like.

"Activating group" refers to those groups which, when attached to a particular functional group or reactive site, render that site more reactive toward covalent bond formation with a second functional group or reactive site. The group of activating groups which are useful for a carboxylic acid include simple ester groups and anhydrides. The ester groups include alkyl, aryl and alkenyl esters and in particular such groups as 4-nitrophenyl, N-hydroxylsuccinimide and pentafluorophenol. Other activating groups are known to those of skill in the art.

"Chemical library" is an intentionally created collection of differing molecules which can be prepared either synthetically or biosynthetically and screened for activity in a variety of different formats (e.g., libraries of soluble molecules; and libraries of compounds tethered to resin beads, silica chips, or other solid supports). The term is also intended to refer to an intentionally created collection of stereoisomers.

A "cleavable moiety" or "releasable group" refers to a molecule which can be cleaved or released under a set of distinct conditions, e.g., certain wave lengths of light of certain chemical conditions. As employed in the context of the present invention, with respect to arrays of releasable polymer the conditions must be such as not to substantially damage or harm the polymer in questions. Persons of skill in the art will recognize what cleavable moiety may be employed for example where the polymer is a nucleic acid or a peptide.

"Predefined region" refers to a localized area on a solid support. It can be where synthesis takes place or where a nucleic acid is placed. Predefined region can also be defined as a "selected region." The predefined region may have any convenient shape, e.g., circular, rectangular, elliptical, wedge-shaped, etc. For the sake of brevity herein, "predefined regions" are sometimes referred to simply as "regions." In some embodiments, a predefined region and, therefore, the area upon which each distinct compound is synthesized or placed is smaller than about 1 cm2 or less than 1 mm2. Within these regions, the molecule therein is preferably in a substantially pure form. In additional embodiments, a predefined region can be achieved by physically separating the regions (i.e., beads, resins, gels, etc.) into wells, trays, etc.

A "linker" is a molecule or group of molecules attached to a substrate and spacing a synthesized polymer from the substrate for exposure and binding to a receptor.

"Solid support", "support", and "substrate" refer to a material or group of materials having a rigid or semi-rigid surface or surfaces. In many embodiments, at least one surface of the solid support will be substantially flat, although in some embodiments it may be desirable to physically separate synthesis regions for different compounds with, for example, wells, raised regions, pins, etched trenches, or the like. According to other embodiments, the solid support(s) will take the form of beads, resins, gels, microspheres, or other geometric configurations.

Isolation and purification of the compounds and intermediates described herein can be effected, if desired, by any suitable separation or purification procedure such as, for example, filtration, extraction, crystallization, column chromatography, thin-layer chromatography, thick-layer (preparative) chromatography, distillation, or a combination of these procedures.

A "channel block" is a material having a plurality of grooves or recessed regions on a surface thereof. The grooves or recessed regions may take on a variety of geometric configurations, including but not limited to stripes, circles, serpentine paths, or the like. Channel blocks may be prepared in a variety of manners, including etching silicon blocks, molding or pressing polymers, etc. A "monomer" is a member of the set of small molecules which can be joined together to form a polymer. The set of monomers includes but is not restricted to, for example, the set of common L-amino acids, the set of common D-amino acids, the set of synthetic amino acids, the set of nucleotides and the set of pentoses and hexoses. As used herein, monomer refers to any member of a basis set for synthesis of a polymer. Thus, monomers refers to dimers trimers, tetramers and higher units of molecules which can be joined to form a polymer. For example, dimers of the 20 naturally occurring L-amino acids for a basis set of 400 monomers for synthesis of polypeptides. Different basis sets of monomers may be used at successive steps in the synthesis of a polymer. Furthermore, each of the sets may include protected members which are modified after synthesis.

A "polymer" is composed of two or more joined monomers and includes for example both linear and cyclic polymers of nucleic acids, polysaccharides, phospholipids, and peptides having either L and D amino acids, hetero-polymers in which a known drug is covalently bound to any of the above, polyurethanes, polyesters, polycarbonates, polyureas, polyamides, polyethyleneimines, polyarylene sulfides, polysiloxanes, polyimides, polyacetates, or other polymers.

A "releasable group" is a moiety or chemical group which is labile, i.e., may be activated or cleaved, under a given set of conditions, but is stable under other sets of conditions.

The term "monomer" as used herein refers to a single unit of polymer, which can be linked with the same or other monomers to form a biopolymer (for example, a single amino acid or nucleotide with two linking groups one or both of which may have removable protecting groups) or a single unit which is not part of a biopolymer. Thus, for example, a nucleotide is a monomer within an oligonucleotide polymer, and an amino acid is a monomer within a protein or peptide polymer; antibodies, antibody fragments, chromosomes, plasmids, mRNA, cRNA, tRNA etc., for example, are also polymers.

The term "biopolymer" or "biological polymer" as used herein is intended to mean repeating units of biological or chemical moieties. Representative biopolymers include, but are not limited to, nucleic acids, oligonucleotides, amino acids, proteins, peptides, hormones, oligosaccharides, lipids, glycolipids, lipopolysaccharides, phospholipids, synthetic analogues of the foregoing, including, but not limited to, inverted nucleotides, peptide nucleic acids, Meta-DNA, and combinations of the above. It is important to note that biopolymers and polymers are not mutually exclusive. Proteins, enzymes, DNA, polyethylene, RNA, are all polymers as they are derived from a repeating monomer units. However, proteins, enzymes, DNA are all biopolymers as many of them first appeared in nature. Sometimes, it is not easy to classify something as a biopolymer or a polymer. For example, vast number of human made amino acid derivatives and nucleotide derivatives have been created and polymerized. Some of these are based on natural products, many more are not. At this point the distinction between the two can be somewhat semantical.

The term "biopolymer synthesis" as used herein is intended to encompass the synthetic production, both in situ (in the cell) and synthetically, e.g. by organic synthetic techniques outside of the cell, of a biopolymer. Related to a bioploymer is a "biomonomer".

The term "combinatorial synthesis strategy" as used herein refers to a combinatorial synthesis strategy is an ordered strategy for parallel synthesis of diverse polymer sequences by sequential addition of reagents which may be represented by a reactant matrix and a switch matrix, the product of which is a product matrix. A reactant matrix is a l column by m row matrix of the building blocks to be added. The switch matrix is all or a subset of the binary numbers, preferably ordered, between l and m arranged in columns. A "binary strategy" is one in which at least two successive steps illuminate a portion, often half, of a region of interest on the substrate. In a binary synthesis strategy, all possible compounds which can be formed from an ordered set of reactants are formed. In most preferred embodiments, binary synthesis refers to a synthesis strategy which also factors a previous addition step. For example, a strategy in which a switch matrix for a masking strategy halves regions that were previously illuminated, illuminating about half of the previously illuminated region and protecting the remaining half (while also protecting about half of previously protected regions and illuminating about half of previously protected regions). It will be recognized that binary rounds may be interspersed with non-binary rounds and that only a portion of a substrate may be subjected to a binary scheme. A combinatorial "masking" strategy is a synthesis which uses light or other spatially selective deprotecting or activating agents to remove protecting groups from materials for addition of other materials such as amino acids.

The term "complementary" as used herein refers to the hybridization or base pairing between nucleotides or nucleic acids, such as, for instance, between the two strands of a double stranded DNA molecule or between an oligonucleotide primer and a primer binding site on a single stranded nucleic acid to be sequenced or amplified. Complementary nucleotides are, generally, A and T (or A and U), or C and G. Two single stranded RNA or DNA molecules are said to be complementary when the nucleotides of one strand, optimally aligned and compared and with appropriate nucleotide insertions or deletions, pair with at least about 80% of the nucleotides of the other strand, usually at least about 90% to 95%, and more preferably from about 98 to 100%. Alternatively, complementarity exists when an RNA or DNA strand will hybridize under selective hybridization conditions to its complement. Typically, selective hybridization will occur when there is at least about 65% complementary over a stretch of at least 14 to 25 nucleotides, preferably at least about 75%, more preferably at least about 90% complementary. See, M. Kanehisa Nucleic Acids Res. 12:203 (1984), incorporated herein by reference.

The term "copolymer" refers to a polymer that is composed of more than one monomer. Copolymers may be prepared by polymerizing one or more monomers to provide a copolymer.

The term "detectable moiety" (Q) means a chemical group that provides a signal. The signal is detectable by any suitable means, including spectroscopic, photochemical, biochemical, immunochemical, electrical, optical or chemical means. In certain cases, the signal is detectable by 2 or more means.

The detectable moiety provides the signal either directly or indirectly. A direct signal is produced where the labeling group spontaneously emits a signal, or generates a signal upon the introduction of a suitable stimulus. Radiolabels, such as $^3H$, $^{125}I$, $^{35}S$, $^{14}C$, or $^{32}P$, and magnetic particles, such as Dynabeads™, are nonlimiting examples of groups that directly and spontaneously provide a signal. Labeling groups that directly provide a signal in the presence of a stimulus include the following nonlimiting examples: colloidal gold (40-80 nm diameter), which scatters green light with high efficiency; fluorescent labels, such as fluorescein, Texas red, rhodamine, and green fluorescent protein (Molecular Probes, Eugene, Oreg.), which absorb and subsequently emit light; chemiluminescent or bioluminescent labels, such as luminol, lophine, acridine salts and luciferins, which are electronically excited as the result of a chemical or biological reaction and subsequently emit light; spin labels, such as vanadium, copper, iron, manganese and nitroxide free radicals, which are detected by electron spin resonance (ESR) spectroscopy; dyes, such as quinoline dyes, triarylmethane dyes and acridine dyes, which absorb specific wavelengths of light; and colored glass or plastic (e.g., polystyrene, polypropylene, latex, etc.) beads. See U.S. Pat. Nos. 3,817,837; 3,850,752; 3,939,350; 3,996,345; 4,277,437; 4,275,149 and 4,366,241.

A detectable moiety provides an indirect signal where it interacts with a second compound that spontaneously emits a signal, or generates a signal upon the introduction of a suitable stimulus. Biotin, for example, produces a signal by forming a conjugate with avidin and/or streptavidin which in turn carry fluorescent moieties. Biotin produces a signal indirectly when it binds the fluorescently labeled ligand (avidin or streptavidin, which is then detected. See Hybridization With Nucleic Acid Probes. In *Laboratory Techniques in Biochemistry and Molecular Biology*; Tijssen, P., Ed.; Elsevier: N.Y., 1993; Vol. 24. An enzyme, such as horseradish peroxidase or alkaline phosphatase, that is attached to an antibody in a label-antibody-antibody as in an ELISA assay, also produces an indirect signal.

A preferred detectable moiety is a fluorescent group. Fluorescent groups typically produce a high signal to noise ratio, thereby providing increased resolution and sensitivity in a detection procedure. Preferably, the fluorescent group absorbs light with a wavelength above about 300 nm, more preferably above about 350 nm, and most preferably above about 400 nm. The wavelength of the light emitted by the fluorescent group is preferably above about 310 nm, more preferably above about 360 nm, and most preferably above about 410 nm.

The fluorescent detectable moiety is selected from a variety of structural classes, including the following nonlimiting examples: 1- and 2-aminonaphthalene, p,p'diaminostilbenes, pyrenes, quaternary phenanthridine salts, 9-aminoacridines, p,p'-diaminobenzophenone imines, anthracenes, oxacarbocyanine, marocyanine, 3-aminoequilenin, perylene, bis-benzoxazole, bis-p-oxazolyl benzene, 1,2-benzophenazin, retinol, bis-3-aminopridinium salts, hellebrigenin, tetracycline, sterophenol, benzimidazolyl phenylamine, 2-oxo-3-chromen, indole, xanthen, 7-hydroxycoumarin, phenoxazine, salicylate, strophanthidin, porphyrins, triarylmethanes, flavin, xanthene dyes (e.g., fluorescein and rhodamine dyes); cyanine dyes; 4,4-difluoro-4-bora-3a,4a-diaza-s-indacene dyes and fluorescent proteins (e.g., green fluorescent protein, phycobiliprotein).

A number of fluorescent compounds are suitable for incorporation into the present invention. Nonlimiting examples of such compounds include the following: dansyl chloride; fluoresceins, such as 3,6-dihydroxy-9-phenylxanthhydrol; rhodamineisothiocyanate; N-phenyl-1-amino-8-sulfonatonaphthalene; N-phenyl-2-amino-6-sulfonatonaphthanlene; 4-acetamido-4-isothiocyanatostilbene-2,2'-disulfonic acid; pyrene-3-sulfonic acid; 2-toluidinonapthhalene-6-sulfonate; N-phenyl, N-methyl 2-aminonaphthalene-6-sulfonate; ethidium bromide; stebrine; auromine-0,2-(9'-anthroyl)palmitate; dansyl phosphatidylethanolamin; N,N'-dioctadecyl oxacarbocycanine; N,N'-dihexyl oxacarbocyanine; merocyanine, 4-(3'-pyrenyl)butryate; d-3-aminodesoxy-equilenin; 12-(9'-anthroyl)stearate; 2-methylanthracene; 9-vinylanthracene; 2,2'-(vinylene-p-phenylene) bisbenzoxazole; p-bis[2-(4-methyl-5-phenyl oxazolyl)] benzene; 6-dimethylamino-1,2-benzophenzin; retinol; bis (3'-aminopyridinium)-1,10-decandiyldiiodide; sulfonaphthylhydrazone of hellibrienin; chlorotetracycline; N-(7-dimethylamino-4-methyl-2-oxo-3-chromenyl)maleimide; N-[p-(2-benzimidazolyl)phenyl]maleimide; N-(4-fluoranthyl)maleimide; bis(homovanillic acid); resazarin; 4-chloro-7-nitro-2,1,3-benzooxadizole; merocyanine 540;

resorufin; rose bengal and 2,4-diphenyl-3(2H)-furanone. Preferably, the fluorescent detectable moiety is a fluorescein or rhodamine dye.

Another preferred detectable moiety is colloidal gold. The colloidal gold particle is typically 40 to 80 nm in diameter. The colloidal gold may be attached to a labeling compound in a variety of ways. In one embodiment, the linker moiety of the nucleic acid labeling compound terminates in a thiol group (—SH), and the thiol group is directly bound to colloidal gold through a dative bond. See Mirkin et al. *Nature* 1996, 382, 607-609. In another embodiment, it is attached indirectly, for instance through the interaction between colloidal gold conjugates of antibiotin and a biotinylated labeling compound. The detection of the gold labeled compound may be enhanced through the use of a silver enhancement method. See Danscher et al. *J. Histotech* 1993, 16, 201-207.

The term "effective amount" as used herein refers to an amount sufficient to induce a desired result.

Although generally used herein to define separate regions containing differing polymer sequences, the term "feature" generally refers to any element, e.g., region, structure or the like, on the surface of a substrate. Typically, substrates to be scanned, will have small feature sizes, and consequently, high feature densities on substrate surfaces. For example, individual features will typically have at least one of a length or width dimension that is no greater than 100 microns, and preferably, no greater than 50 microns, and more preferably no greater than about 20 microns. Thus, for embodiments employing substrates having a plurality of polymer sequences on their surfaces, each different polymer sequence will typically be substantially contained within a single feature.

The term "fragmentation" refers to the breaking of nucleic acid molecules into smaller nucleic acid fragments. In certain embodiments, the size of the fragments generated during fragmentation can be controlled such that the size of fragments is distributed about a certain predetermined nucleic acid length.

The term "genome" as used herein is all the genetic material in the chromosomes of an organism. DNA derived from the genetic material in the chromosomes of a particular organism is genomic DNA. A genomic library is a collection of clones made from a set of randomly generated overlapping DNA fragments representing the entire genome of an organism.

The term "hybridization" as used herein refers to the process in which two single-stranded polynucleotides bind non-covalently to form a stable double-stranded polynucleotide; triple-stranded hybridization is also theoretically possible. The resulting (usually) double-stranded polynucleotide is a "hybrid." The proportion of the population of polynucleotides that forms stable hybrids is referred to herein as the "degree of hybridization." Hybridizations are usually performed under stringent conditions, for example, at a salt concentration of no more than 1 M and a temperature of at least 25° C. For example, conditions of 5×SSPE (750 mM NaCl, 50 mM NaPhosphate, 5 mM EDTA, pH 7.4) and a temperature of 25-30° C. are suitable for allele-specific probe hybridizations. For stringent conditions, see, for example, Sambrook, Fritsche and Maniatis. "Molecular Cloning A laboratory Manual" $2^{nd}$ Ed. Cold Spring Harbor Press (1989) which is hereby incorporated by reference in its entirety for all purposes above.

The term "hybridization conditions" as used herein will typically include salt concentrations of less than about 1M, more usually less than about 500 mM and preferably less than about 200 mM. Hybridization temperatures can be as low as 5° C., but are typically greater than 22° C., more typically greater than about 30° C., and preferably in excess of about 37° C. Longer fragments may require higher hybridization temperatures for specific hybridization. As other factors may affect the stringency of hybridization, including base composition and length of the complementary strands, presence of organic solvents and extent of base mismatching, the combination of parameters is more important than the absolute measure of any one alone.

The term "hybridization probes" as used herein are oligonucleotides capable of binding in a base-specific manner to a complementary strand of nucleic acid. Such probes include peptide nucleic acids, as described in Nielsen et al., *Science* 254, 1497-1500 (1991), and other nucleic acid analogs and nucleic acid mimetics.

The term "hybridizing specifically to" as used herein refers to the binding, duplexing, or hybridizing of a molecule only to a particular nucleotide sequence or sequences under stringent conditions when that sequence is present in a complex mixture (for example, total cellular DNA or RNA.)

The term "initiation monomer" or "initiator monomer" as used herein is meant to indicate the first monomer which is covalently attached via reactive groups, e.g., nucleophiles and electrophiles to the surface of the polymer, or the first monomer which is attached to a linker or spacer arm attached to the polymer, the linker or spacer arm being attached to the polymer via reactive groups.

The term "isolated nucleic acid" as used herein means the predominant species present (i.e., on a molar basis it is more abundant than any other individual species in the composition). Preferably, an isolated nucleic acid comprises at least about 50, 80 or 90% (on a molar basis) of all macromolecular species present. Most preferably, the object species is purified to essential homogeneity (contaminant species cannot be detected in the composition by conventional detection methods).

The term "ligand" as used herein refers to a molecule that is recognized by a particular receptor. The agent bound by or reacting with a receptor is called a "ligand," a term which is definitionally meaningful only in terms of its counterpart receptor. The term "ligand" does not imply any particular molecular size or other structural or compositional feature other than that the substance in question is capable of binding or otherwise interacting with the receptor. Also, a ligand may serve either as the natural ligand to which the receptor binds, or as a functional analogue that may act as an agonist or antagonist. Examples of ligands that can be investigated by this invention include, but are not restricted to, agonists and antagonists for cell membrane receptors, toxins and venoms, viral epitopes, hormones (for example, opiates, steroids, etc.), hormone receptors, peptides, enzymes, enzyme substrates, substrate analogs, transition state analogs, cofactors, drugs, proteins, and antibodies.

The term "linkage disequilibrium" or sometimes refer by allelic association as used herein refers to the preferential association of a particular allele or genetic marker with a specific allele, or genetic marker at a nearby chromosomal location more frequently than expected by chance for any particular allele frequency in the population. For example, if locus X has alleles a and b, which occur equally frequently, and linked locus Y has alleles c and d, which occur equally frequently, one would expect the combination ac to occur with a frequency of 0.25. If ac occurs more frequently, then alleles a and c are in linkage disequilibrium. Linkage disequilibrium may result from natural selection of certain combination of alleles or because an allele has been introduced into a population too recently to have reached equilibrium with linked alleles.

The term "mixed population" or sometimes refer by "complex population" as used herein refers to any sample containing both desired and undesired nucleic acids. As a non-limiting example, a complex population of nucleic acids may be total genomic DNA, total genomic RNA or a combination thereof. Moreover, a complex population of nucleic acids may have been enriched for a given population but include other undesirable populations. For example, a complex population of nucleic acids may be a sample which has been enriched for desired messenger RNA (mRNA) sequences but still includes some undesired ribosomal RNA sequences (rRNA).

The term "monomer" as used herein refers to any member of the set of molecules that can be joined together to form an oligomer or polymer. The set of monomers useful in the present invention includes, but is not restricted to, for the example of (poly)peptide synthesis, the set of L-amino acids, D-amino acids, or synthetic amino acids. As used herein, "monomer" refers to any member of a basis set for synthesis of an oligomer. For example, dimers of L-amino acids form a basis set of 400 "monomers" for synthesis of polypeptides. Different basis sets of monomers may be used at successive steps in the synthesis of a polymer. The term "monomer" also refers to a chemical subunit that can be combined with a different chemical subunit to form a compound larger than either subunit alone.

The term "mRNA," or sometimes referred to as "mRNA transcripts," as used herein, includes, but not limited to pre-mRNA transcript(s), transcript processing intermediates, mature mRNA(s) ready for translation and transcripts of the gene or genes, or nucleic acids derived from the mRNA transcript(s). Transcript processing may include splicing, editing and degradation. As used herein, a nucleic acid derived from an mRNA transcript refers to a nucleic acid for whose synthesis the mRNA transcript or a subsequence thereof has ultimately served as a template. Thus, a cDNA reverse transcribed from an mRNA, an RNA transcribed from that cDNA, a DNA amplified from the cDNA, an RNA transcribed from the amplified DNA, etc., are all derived from the mRNA transcript and detection of such derived products is indicative of the presence and/or abundance of the original transcript in a sample. Thus, mRNA derived samples include, but are not limited to, mRNA transcripts of the gene or genes, cDNA reverse transcribed from the mRNA, cRNA transcribed from the cDNA, DNA amplified from the genes, RNA transcribed from amplified DNA, and the like.

The term "nucleic acid library" or sometimes refer by "array" as used herein refers to an intentionally created collection of nucleic acids which can be prepared either synthetically or biosynthetically and screened for biological activity in a variety of different formats (for example, libraries of soluble molecules; and libraries of oligos tethered to resin beads, silica chips, or other solid supports). Additionally, the term "array" is meant to include those libraries of nucleic acids which can be prepared by spotting nucleic acids of essentially any length (for example, from 1 to about 1000 nucleotide monomers in length) onto a substrate. The term "nucleic acid" as used herein refers to a polymeric form of nucleotides of any length, either ribonucleotides, deoxyribonucleotides or peptide nucleic acids (PNAs), that comprise purine and pyrimidine bases, or other natural, chemically or biochemically modified, non-natural, or derivatized nucleotide bases. The backbone of the polynucleotide can comprise sugars and phosphate groups, as may typically be found in RNA or DNA, or modified or substituted sugar or phosphate groups. A polynucleotide may comprise modified nucleotides, such as methylated nucleotides and nucleotide analogs. The sequence of nucleotides may be interrupted by non-nucleotide components. Thus the terms nucleoside, nucleotide, deoxynucleoside and deoxynucleotide generally include analogs such as those described herein. These analogs are those molecules having some structural features in common with a naturally occurring nucleoside or nucleotide such that when incorporated into a nucleic acid or oligonucleoside sequence, they allow hybridization with a naturally occurring nucleic acid sequence in solution. Typically, these analogs are derived from naturally occurring nucleosides and nucleotides by replacing and/or modifying the base, the ribose or the phosphodiester moiety. The changes can be tailor made to stabilize or destabilize hybrid formation or enhance the specificity of hybridization with a complementary nucleic acid sequence as desired.

The term "nucleic acids" as used herein may include any polymer or oligomer of pyrimidine and purine bases, preferably cytosine, thymine, and uracil, and adenine and guanine, respectively. See Albert L. Lehninger, PRINCIPLES OF BIOCHEMISTRY, at 793-800 (Worth Pub. 1982). Indeed, the present invention contemplates any deoxyribonucleotide, ribonucleotide or peptide nucleic acid component, and any chemical variants thereof, such as methylated, hydroxymethylated or glucosylated forms of these bases, and the like. The polymers or oligomers may be heterogeneous or homogeneous in composition, and may be isolated from naturally-occurring sources or may be artificially or synthetically produced. In addition, the nucleic acids may be DNA or RNA, or a mixture thereof, and may exist permanently or transitionally in single-stranded or double-stranded form, including homoduplex, heteroduplex, and hybrid states.

The term "oligonucleotide" or sometimes refer by "polynucleotide" as used herein refers to a nucleic acid ranging from at least 2, preferable at least 8, and more preferably at least 20 nucleotides in length or a compound that specifically hybridizes to a polynucleotide. Polynucleotides of the present invention include sequences of deoxyribonucleic acid (DNA) or ribonucleic acid (RNA) which may be isolated from natural sources, recombinantly produced or artificially synthesized and mimetics thereof. A further example of a polynucleotide of the present invention may be peptide nucleic acid (PNA). The invention also encompasses situations in which there is a nontraditional base pairing such as Hoogsteen base pairing which has been identified in certain tRNA molecules and postulated to exist in a triple helix. "Polynucleotide" and "oligonucleotide" are used interchangeably in this application.

The term "polymorphism" as used herein refers to the occurrence of two or more genetically determined alternative sequences or alleles in a population. A polymorphic marker or site is the locus at which divergence occurs. Preferred markers have at least two alleles, each occurring at frequency of greater than 1%, and more preferably greater than 10% or 20% of a selected population. A polymorphism may comprise one or more base changes, an insertion, a repeat, or a deletion. A polymorphic locus may be as small as one base pair. Polymorphic markers include restriction fragment length polymorphisms, variable number of tandem repeats (VNTR's), hypervariable regions, minisatellites, dinucleotide repeats, trinucleotide repeats, tetranucleotide repeats, simple sequence repeats, and insertion elements such as Alu. The first identified allelic form is arbitrarily designated as the reference form and other allelic forms are designated as alternative or variant alleles. The allelic form occurring most frequently in a selected population is sometimes referred to as the wildtype form. Diploid organisms may be homozygous or heterozygous for allelic forms. A diallelic polymorphism has two forms. A triallelic polymorphism has three forms. Single nucleotide polymorphisms (SNPs) are included in polymorphisms.

The term "primer" as used herein refers to a single-stranded oligonucleotide capable of acting as a point of initiation for template-directed DNA synthesis under suitable conditions for example, buffer and temperature, in the presence of four different nucleoside triphosphates and an agent for polymerization, such as, for example, DNA or RNA polymerase or reverse transcriptase. The length of the primer, in any given case, depends on, for example, the intended use of the primer, and generally ranges from 15 to 30 nucleotides. Short primer molecules generally require cooler temperatures to form sufficiently stable hybrid complexes with the template. A primer need not reflect the exact sequence of the template but must be sufficiently complementary to hybridize with such template. The primer site is the area of the template to which a primer hybridizes. The primer pair is a set of primers including a 5' upstream primer that hybridizes with the 5' end of the sequence to be amplified and a 3' downstream primer that hybridizes with the complement of the 3' end of the sequence to be amplified.

The term "probe" as used herein refers to a surface-immobilized molecule that can be recognized by a particular target. See U.S. Pat. No. 6,582,908 for an example of arrays having all possible combinations of probes with 10, 12, and more bases. Examples of probes that can be investigated by this invention include, but are not restricted to, agonists and antagonists for cell membrane receptors, toxins and venoms, viral epitopes, hormones (for example, opioid peptides, steroids, etc.), hormone receptors, peptides, enzymes, enzyme substrates, cofactors, drugs, lectins, sugars, oligonucleotides, nucleic acids, oligosaccharides, proteins, and monoclonal antibodies.

The term "receptor" as used herein refers to a molecule that has an affinity for a given ligand. Receptors may be naturally-occurring or manmade molecules. Also, they can be employed in their unaltered state or as aggregates with other species. Receptors may be attached, covalently or noncovalently, to a binding member, either directly or via a specific binding substance. Examples of receptors which can be employed by this invention include, but are not restricted to, antibodies, cell membrane receptors, monoclonal antibodies and antisera reactive with specific antigenic determinants (such as on viruses, cells or other materials), drugs, polynucleotides, nucleic acids, peptides, cofactors, lectins, sugars, polysaccharides, cells, cellular membranes, and organelles. Receptors are sometimes referred to in the art as anti-ligands. As the term receptors is used herein, no difference in meaning is intended. A "Ligand Receptor Pair" is formed when two macromolecules have combined through molecular recognition to form a complex. Other examples of receptors which can be investigated by this invention include but are not restricted to those molecules shown in U.S. Pat. No. 5,143,854, which is hereby incorporated by reference in its entirety.

The term "target" as used herein refers to a molecule that has an affinity for a given probe. Targets may be naturally-occurring or man-made molecules. Also, they can be employed in their unaltered state or as aggregates with other species. Targets may be attached, covalently or noncovalently, to a binding member, either directly or via a specific binding substance. Examples of targets which can be employed by this invention include, but are not restricted to, antibodies, cell membrane receptors, monoclonal antibodies and antisera reactive with specific antigenic determinants (such as on viruses, cells or other materials), drugs, oligonucleotides, nucleic acids, peptides, cofactors, lectins, sugars, polysaccharides, cells, cellular membranes, and organelles. Targets are sometimes referred to in the art as anti-probes. As the term targets is used herein, no difference in meaning is intended. A "Probe Target Pair" is formed when two macromolecules have combined through molecular recognition to form a complex.

C. Primer Array Synthesis and Validation

This invention relates to massively parallel oligonucleotide primer synthesis for muliplex PCR, or other applications that utilize large collections of defined oligonucleotides ($10^1$ to $10^5$ different sequences, generally <60 bases in length). Established photolithographic strategies provide a convenient approach to efficiently produce an array of such primers. It has been discovered in accordance with the present invention that to achieve suitable primer purity and quantity, a highly-efficient photogroup (>90% average stepwise coupling efficiency) is preferred, such as NPPOC or MBPMOC:

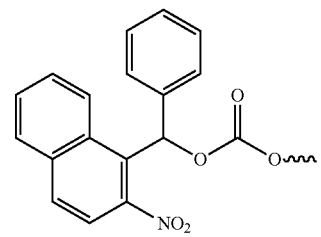

(2-nitro-naphthalen-1-yl)-phenylmethyloxycarbonyl (NNPOC)

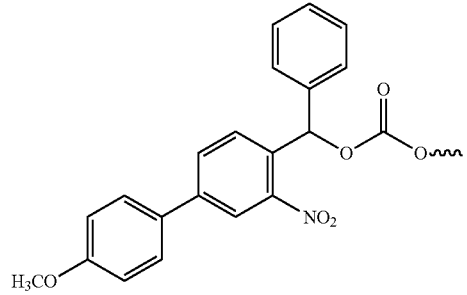

(4'-methoxy-3-nitro-biphenyl-4-yl)-phenylmethyloxycarbonyl (MBPMOC)

Both NNPOC and MBPMOC give greater than 90% stepwise coupling. For example NNPOC gives 97-98% stepwise coupling.

Alternatively, in accordance with an aspect of the present invention, DMT-based photoresist strategies could be implemented to achieve high-fidelity primers (See, e.g., 60/557,550 and non provisional filed Dec. 22, 2004). Ink-jet based in situ oligonucleotide synthesis approaches could also be employed in accordance with an aspect of the instant invention. Despite the specific primer array synthesis methodology, high-density substrates (200-2000 pmol/cm2) can be employed to significantly boost primer yield. Such substrates are typically based upon three-dimensional architectures, thin-films or polymeric coatings.

One aspect of the present invention is that a portion of each "primer" can synthesized in a manner that prevents a representative quantity from being cleaved from the solid-support during deprotection. The representative portion that is not cleaved retains its position on the array and is therefore available for analytical testing and assessment of its identity/purity for QC purposes. An exemplary analytical test is MALDI-TOF mass spectrometry, whereby a laser is directed to a predetermined coordinate (i.e., feature) and its energy is used (either directly or indirectly) to ionize the attached primer, thus providing an assessment of individual primer length-distribution (i.e., purity) and also primer composition and identity (i.e, MW). Analysis of each feature is expected to take about one second, so the automated analysis of a representative primer array or arrays is completely feasible. Various orthogonal chemical or photoactive linkers can be used to facilitate ionization, and several are known in the art. See, e,g., Cuppoletti, et. al. "RELEASABLE POLYMER ARRAYS" US 200410248162A1 (incorporated herein for all purposes as if set forth here in full).

The "portion" of each primer that is available for analysis is predetermined either by (A) surface chemistry preparation, by doping orthogonal linker functional groups, or (B) coupling mixtures of orthogonal phosphoramidite linkers prior to primer synthesis. In the case of MALDI-TOF analysis, it is likely necessary to overlay or otherwise incorporate an energy transfer "matrix" to enhance ionization, although certain substrates are known in the art to allow suitable ionization in the absence of such a matrix.

Primer synthesis could be conducted in either the 3'→5' or the 5'→3' orientation. Synthesis in the 5'→3' orientation assures that the 3'-hydroxy functionality (required for extension) is not chemically blocked. It is contemplated that reporter groups (e.g., chromophores, fluorophores, detectable labels) or affinity tags (e.g., biotin) can be incorporated into the primer sequences, in either single-color or multi-color formats. Phosphorylation at either terminus (or both termini) is also possible. Dual-labeled oligonucleotide "probes" (e.g., TaqMan probes and molecular beacons) are also contemplated. Additionally, non-conventional building blocks (e.g., nucleoside analogues or mimics) could be incorporated into the probe/primer, either in part or in whole. Primer quantity will be a function of the stepwise coupling yield, primer length, the surface loading, feature size and feature redundancy of a given array design. The relative concentration of each primer can be adjusted by controlling the redundancy of the array design.

It is to be understood that the above description is intended to be illustrative and not restrictive. Many variations of the invention will be apparent to those of skill in the art upon reviewing the above description. All cited references, including patent and non-patent literature, are incorporated herein by reference in their entireties for all purposes.

What is claimed is:

1. A compound represented by the following structural formula:

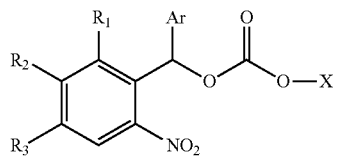

wherein:
X is an oligonucleotide or a peptide;
$R_1$, $R_2$, and $R_3$, are each independently H, or $R_1$ and $R_2$ form a fused aryl ring, or $R_3$ is aryl; and
Ar is aryl.

2. The compound of claim 1, represented by the following structural formula:

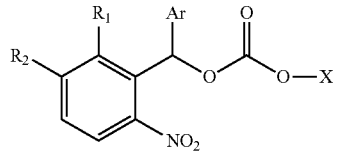

wherein:
$R_1$ and $R_2$ form a fused aryl ring.

3. The compound of claim 1, represented by the following structural formula:

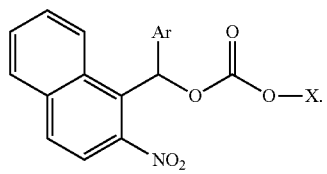

4. The compound of claim 1, represented by the following structural formula:

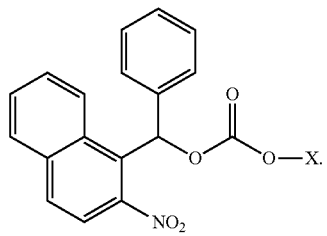

5. The compound of claim 1, represented by the following structural formula:

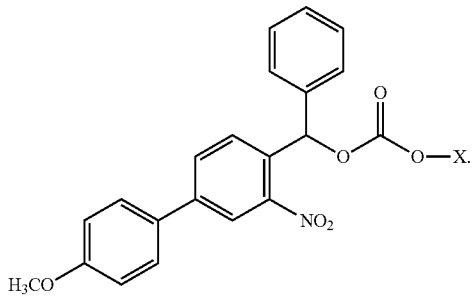

* * * * *